(12) United States Patent
Takakuwa et al.

(10) Patent No.: US 11,519,430 B2
(45) Date of Patent: Dec. 6, 2022

(54) FLOW RATE CONTROLLER AND DRIVE DEVICE COMPRISING SAME

(71) Applicant: SMC CORPORATION, Chiyoda-ku (JP)

(72) Inventors: Youji Takakuwa, Kitakatsushika-gun (JP); Akihiro Kazama, Moriya (JP); Hiroyuki Asahara, Tsukuba (JP); Kengo Monden, Ushiku (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 17/292,223

(22) PCT Filed: Oct. 30, 2019

(86) PCT No.: PCT/JP2019/042475
§ 371 (c)(1),
(2) Date: May 7, 2021

(87) PCT Pub. No.: WO2020/095775
PCT Pub. Date: May 14, 2020

(65) Prior Publication Data
US 2021/0404486 A1     Dec. 30, 2021

(30) Foreign Application Priority Data
Nov. 9, 2018   (JP) .............................. JP2018-211493

(51) Int. Cl.
*F15B 11/06*   (2006.01)
*F15B 11/04*   (2006.01)
(Continued)

(52) U.S. Cl.
CPC .............. *F15B 11/06* (2013.01); *F15B 11/04* (2013.01); *F15B 13/0402* (2013.01);
(Continued)

(58) Field of Classification Search
CPC ....... F15B 11/06; F15B 11/04; F15B 11/0406; F15B 11/0416; F15B 11/042;
(Continued)

(56) References Cited

U.S. PATENT DOCUMENTS 6,305,264 B1    10/2001   Yang et al.
6,557,452 B1 *   5/2003   Morroney ............. F15B 11/048
                                                                91/465

FOREIGN PATENT DOCUMENTS

CN    1137335 C        2/2004
DE    3537130 A1 *    4/1987    .............. F15B 11/02
(Continued)

OTHER PUBLICATIONS

DE 3537130 A1 machine translation to English from espacenet (Year: 1987).*
(Continued)

*Primary Examiner* — Dustin T Nguyen
*Assistant Examiner* — Michael Quandt
(74) *Attorney, Agent, or Firm* — Oblon, McClelland, Maier & Neustadt, L.L.P.

(57) ABSTRACT

A main flow path that introduces high-pressure air to an air cylinder, or discharges exhaust air therefrom, includes a sub flow path provided alongside the main flow path; an exhaust flow rate adjustment unit that suppresses the operation speed of the air cylinder by adjusting the flow rate of the exhaust air flowing through the sub flow path; and a switching valve that is connected between the air cylinder, the main flow path and the sub flow path, and that connects the main flow path and the sub flow path to the air cylinder in a switching manner. The switching valve is constituted by a spool valve.

6 Claims, 14 Drawing Sheets

(51) Int. Cl.
  *F15B 13/04*     (2006.01)
  *F16K 11/07*     (2006.01)
  *F16K 31/122*    (2006.01)
(52) U.S. Cl.
  CPC ............ *F15B 2211/40515* (2013.01); *F15B 2211/40584* (2013.01); *F15B 2211/7053* (2013.01); *F15B 2211/75* (2013.01); *F15B 2211/8855* (2013.01); *F16K 11/07* (2013.01); *F16K 31/122* (2013.01)
(58) Field of Classification Search
  CPC ..... F15B 11/044; F15B 11/046; F15B 11/048; F15B 2211/8855
  See application file for complete search history.

(56) References Cited

FOREIGN PATENT DOCUMENTS

| | | |
|---|---|---|
| JP | 55-135274 A | 10/1980 |
| JP | 58-196402 U | 12/1983 |
| JP | 11-230111 A | 8/1999 |
| JP | 2000-199502 A | 7/2000 |
| JP | 5578502 B2 | 8/2014 |

OTHER PUBLICATIONS

International Search Report dated Dec. 10, 2019 in PCT/JP2019/042475 filed Oct. 30, 2019, 2 pages.
Taiwan Office Action dated Oct. 14, 2020 in Taiwanese Patent Application No. 108140657 filed Nov. 8, 2019, 18 pages (with English Translation).

\* cited by examiner

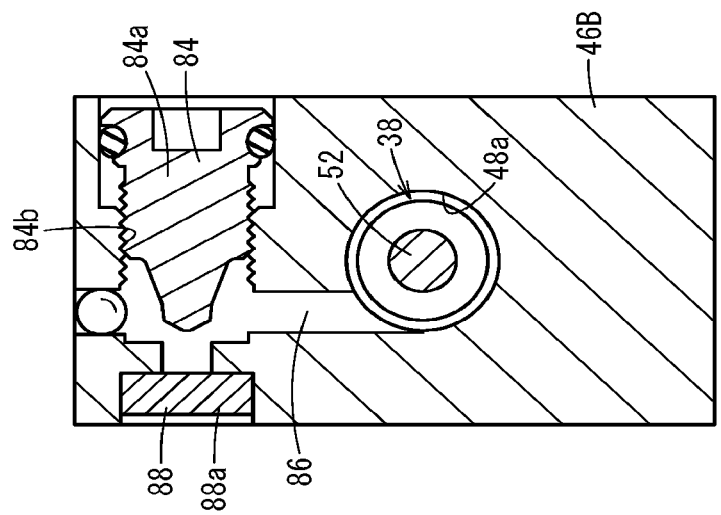
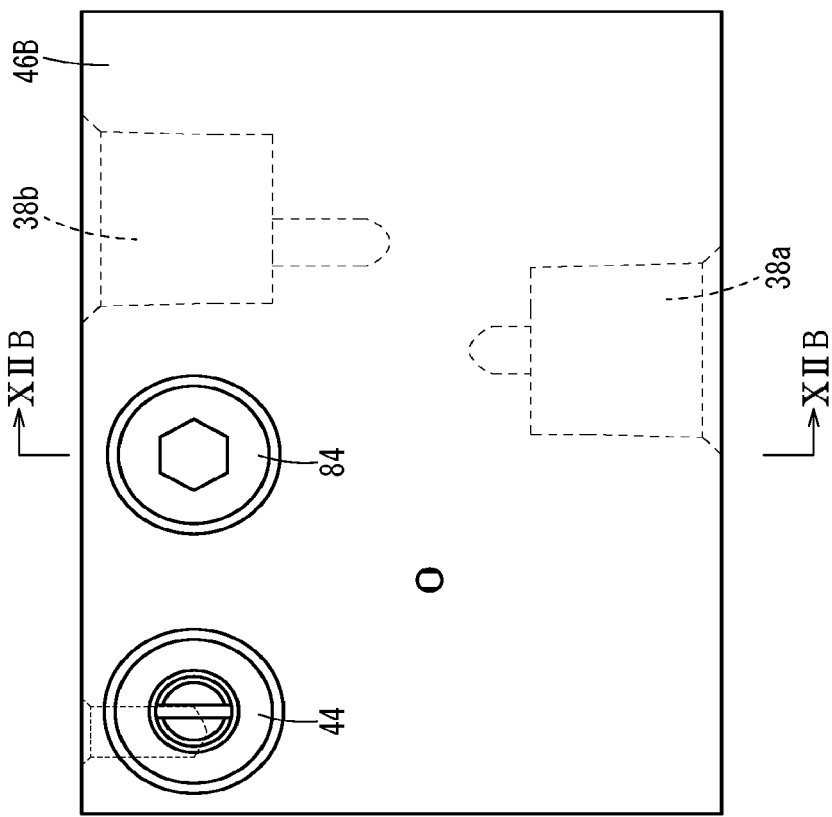
FIG. 12B
FIG. 12A

FLOW RATE CONTROLLER AND DRIVE DEVICE COMPRISING SAME

TECHNICAL FIELD

The present invention relates to flow rate controllers for air cylinders and drive devices including flow rate controllers.

BACKGROUND ART

Cushioning members using rubber or soft resins such as urethane, oil dampers, and the like attached to ends of air cylinders have been used as shock absorbers reducing impact at the ends of the stokes. However, such shock absorbers that mechanically reduce impact occurring in air cylinders have life depending on the number of operations and require regular maintenance that involves disassembling of devices or facilities each time.

To deal with this, a speed controller achieving a shock absorber mechanism using a device that can be attached later only with air pipes without disassembling devices or facilities has been proposed (Japanese Patent No. 5578502). The speed controller reduces impact by controlling the operating speed of an air cylinder to decrease near the end of the stroke.

The speed controller includes a three-way shuttle valve disposed on a channel between a high-pressure air supply source and the air cylinder to guide exhaust air from the air cylinder to an exhaust channel provided separately from the channel for introducing high-pressure air. Exhaust air is discharged via a switching valve and a first throttle valve disposed on the exhaust channel and a second throttle valve. The switching valve switches the channel for exhaust air such that exhaust air passes through the first throttle valve that reduces the stroke speed near the end of the stroke to reduce impact occurring in the air cylinder during the exhaust stroke.

SUMMARY OF INVENTION

The above-described speed controller uses the shuttle valve to switch between the channel for high-pressure air and the channel for exhaust air. Since the shuttle valve splits a channel into the two channels on the downstream side of a valve element, the cross-sectional areas of the channels are limited, and the flow rates of high-pressure air and exhaust air cannot be sufficiently high. As a result, the speed controller prevents high-speed operation of the air cylinder.

Thus, an embodiment of the present invention has the object of providing a flow rate controller and a drive device including a flow rate controller having a high flow rate while having the impact reducing function of reducing impact occurring in a cylinder.

A flow rate controller according to an aspect of the present invention includes a primary channel through which high-pressure air supplied to an air cylinder and exhaust air discharged from the air cylinder pass, a secondary channel disposed in parallel to the primary channel, an exhaust flow rate adjustment portion disposed on the secondary channel and configured to adjust a flow rate of the exhaust air flowing in the secondary channel, a switching valve connected between the air cylinder and the primary channel and between the air cylinder and the secondary channel, and switching between a first position where the air cylinder communicates with the primary channel and a second position where the air cylinder communicates with the secondary channel, and a pilot-air adjustment portion configured to adjust an amount of time before the switching valve switches from the first position to the second position, wherein the switching valve is formed of a spool valve switching to the first position by pilot pressure from the primary channel and returning to the second position as the pilot pressure decreases, and wherein the pilot-air adjustment portion includes a throttle valve configured to regulate a flow rate of pilot air flowing out of the switching valve.

Moreover, a drive device according to another aspect of the present invention includes a high-pressure air supply source configured to supply high-pressure air to an air cylinder; an air outlet through which exhaust air discharged from the air cylinder is discharged; a primary channel which is connected to the air cylinder and through which the high-pressure air and the exhaust air pass; a secondary channel disposed in parallel to the primary channel and communicating with the air outlet; an operation switching valve connected between the primary channel and the high-pressure air supply source and between the primary channel and the air outlet, and switching between connecting the primary channel to the high-pressure air supply source and connecting the primary channel to the air outlet; and a flow rate controller including an exhaust flow rate adjustment portion configured to adjust a flow rate of the exhaust air flowing in the secondary channel, a switching valve connected between the air cylinder and the primary channel and between the air cylinder and the secondary channel, and switching between a first position where the air cylinder communicates with the primary channel and a second position where the air cylinder communicates with the secondary channel, and a pilot-air adjustment portion configured to adjust an amount of time before the switching valve switches from the first position to the second position, the switching valve being formed of a spool valve switching to the first position by pilot pressure from the primary channel and returning to the second position as the pilot pressure decreases, the pilot-air adjustment portion including a throttle valve configured to regulate a flow rate of pilot air flowing out of the switching valve.

In accordance with the flow rate controller and the drive device according to the above-described aspects, the primary channel for supplying high-pressure air is also used as the channel for exhaust air, negating the need for a shuttle valve. In addition, the operating speed of the air cylinder is adjusted using a spool valve whose channel cross-section can be easily increased. As a result, the flow rate controller and the drive device including the flow rate controller can achieve a high flow rate while having the impact reducing function of reducing impact occurring in the cylinder.

BRIEF DESCRIPTION OF DRAWINGS

FIG. 12A is a plan view of the housing in FIG. 11A, and FIG. 12B is a cross-sectional view of the housing in FIG. 11A in the vicinity of a needle, where the cross-sectional view in FIG. 12B is taken along line XIIB-XIIB in FIG. 12A;

DESCRIPTION OF EMBODIMENTS

Preferred embodiments of the present invention will be described in detail below with reference to the accompanying drawings.

First Embodiment

Figure 1:
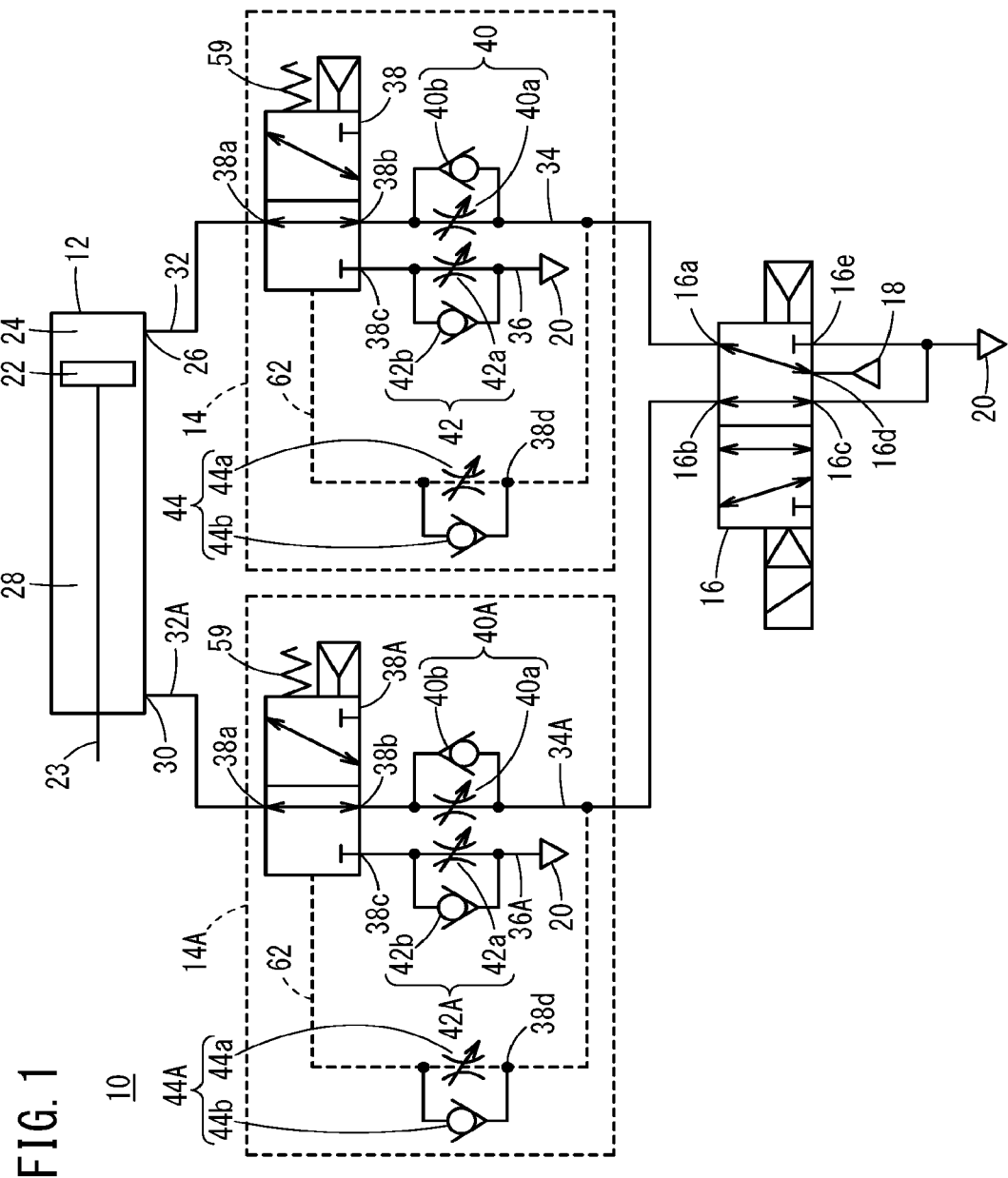
FIG. 1 is a fluid circuit diagram of flow rate controllers and a drive device according to a first embodiment.

As illustrated in FIG. 1, a drive device 10 according to this embodiment is used to drive an air cylinder 12, and includes a flow rate controller 14 on a head side, a flow rate controller 14A on an end side, an operation switching valve 16, a high-pressure air supply source 18, and an air outlet 20.

The air cylinder 12 is a double-acting cylinder used in, for example, automated facility lines and includes a piston 22 partitioning the air cylinder into cylinder chambers, and a piston rod 23 connected to the piston 22. A head-side pressure chamber 24 on the head side of the piston 22 is provided with a head-side port 26. Moreover, an end-side pressure chamber 28 on the end side of the piston 22 is provided with an end-side port 30. The head-side port 26 is connected to a first channel 32, whereas the end-side port 30 is connected to a second channel 32A. High-pressure air is supplied to and discharged from the air cylinder 12 via the first channel 32 and the second channel 32A, respectively. The first channel 32 is provided with the head-side flow rate controller 14. Moreover, the second channel 32A is provided with the end-side flow rate controller 14A.

The flow rate controller 14 includes a primary channel 34 connected to the first channel 32, and a secondary channel 36 disposed in parallel to the primary channel 34. A head-side switching valve 38 connected to the head-side port 26 is disposed on the primary channel 34 and the secondary channel 36. The head-side switching valve 38 is a so-called three-way valve and is provided with a cylinder port 38a connected to the head-side port 26. The head-side switching valve 38 is further provided with a valve port 38b, an exhaust port 38c, and a pilot port 38d. The valve port 38b is connected to a head-side operating-speed adjustment portion 40 via the primary channel 34. The exhaust port 38c is connected to a head-side exhaust flow rate adjustment portion 42 via the secondary channel 36. The pilot port 38d is provided with a pilot-air adjustment portion 44.

Figure 2A:
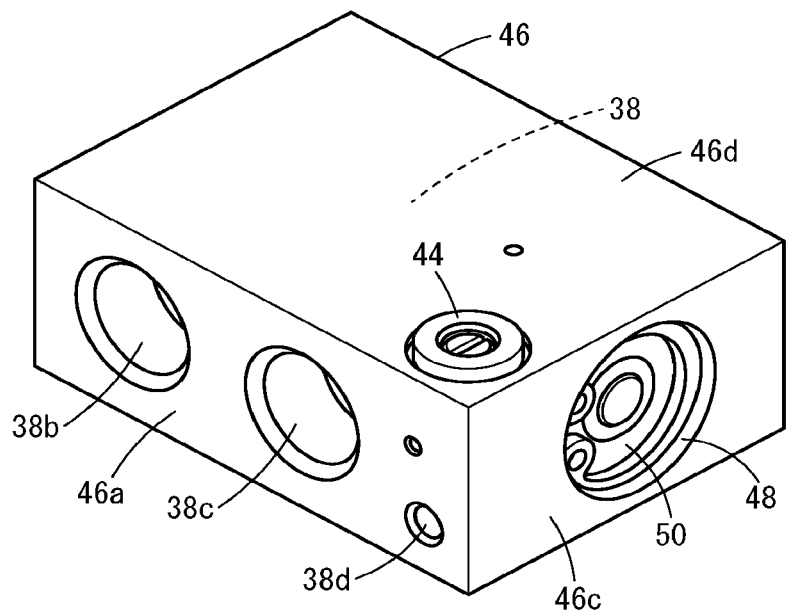
FIG. 2A is a perspective view of a housing of the flow rate controllers in FIG. 1.
Figure 2B:
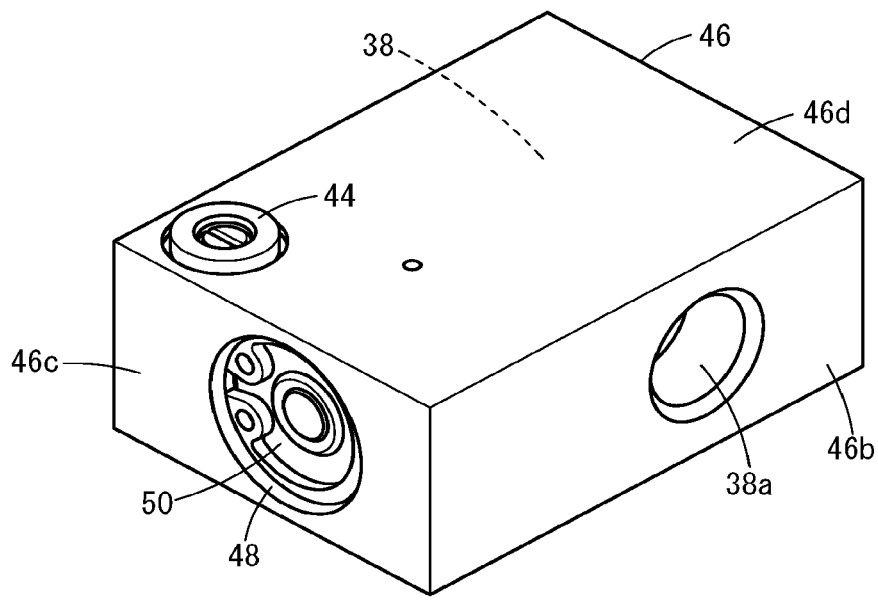
FIG. 2B is a perspective view of the housing in FIG. 2A viewed from a side on which a cylinder port lies.

As illustrated in FIG. 2A, the switching valve 38 is disposed inside a box-shaped housing 46 together with the pilot-air adjustment portion 44. The valve port 38b, the exhaust port 38c, and the pilot port 38d are created in one side face 46a of the housing 46. Moreover, as illustrated in FIG. 2B, the cylinder port 38a is created in another side face 46b opposite to the one side face 46a. Yet moreover, a through-hole 48 for accommodating the switching valve 38 has an opening in either side face 46c perpendicular to the one side face 46a and the other side face 46b of the housing 46. End covers 50 are attached to either end of the through-hole 48 to close the through-hole 48. Furthermore, an adjustment screw of the pilot-air adjustment portion 44 is exposed at a top face 46d of the housing 46.

Figure 3A:
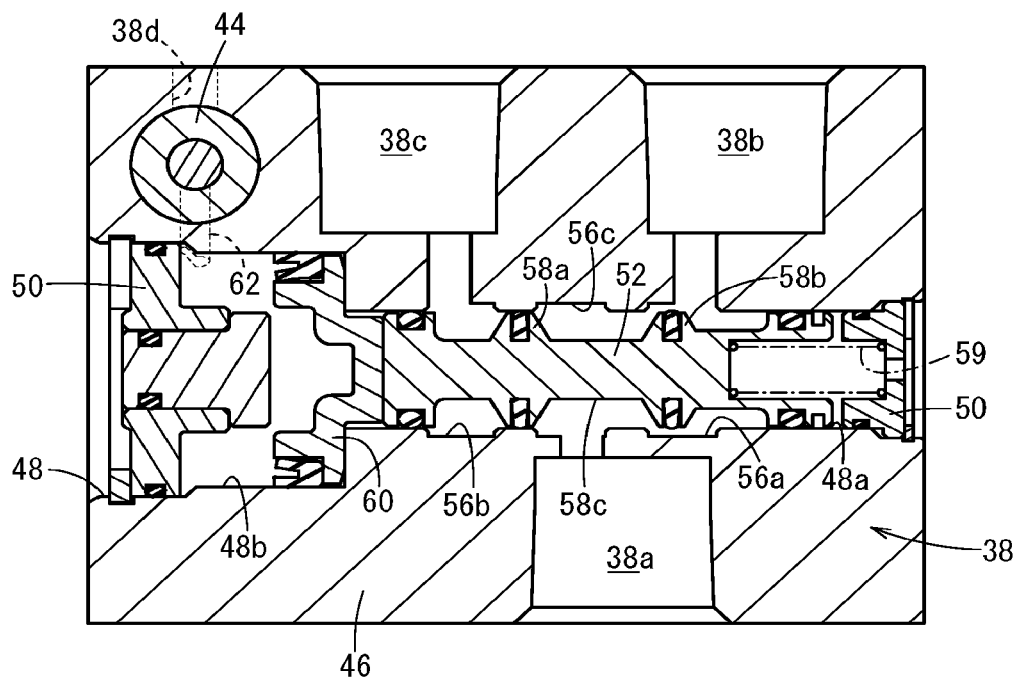
FIG. 3A is a cross-sectional view of a switching valve in the housing in FIG. 2A in a first position.

The switching valve 38 is configured as a spool valve and includes a spool 52 disposed inside the through-hole 48 in the housing 46 as illustrated in FIG. 3A. The spool 52 is accommodated in a spool guide portion 48a of the through-hole 48 and slides along the spool guide portion 48a. The spool guide portion 48a is provided with a first communication groove 56a communicating with the valve port 38b, a second communication groove 56b communicating with the exhaust port 38c, and a third communication groove 56c formed between the first communication groove 56a and the second communication groove 56b and communicating with the cylinder port 38a.

The spool 52 is provided with a first sealing wall 58a blocking communication between the second communication groove 56b and the third communication groove 56c in a first position, a second sealing wall 58b blocking communication between the first communication groove 56a and the third communication groove 56c in a second position, and a recess 58c at which the spool 52 is radially reduced. The recess 58c is formed between the first sealing wall 58a and the second sealing wall 58b and configured to allow communication between the first communication groove 56a and the third communication groove 56c in the first position.

Figure 3B:
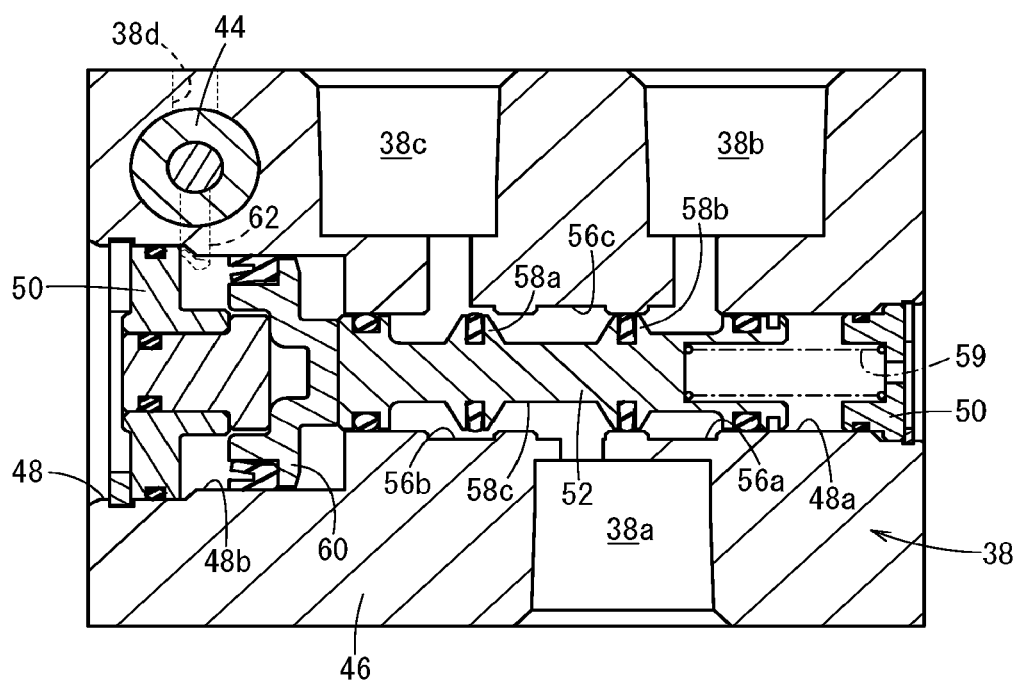
FIG. 3B is a cross-sectional view of the switching valve in the housing in FIG. 2A in a second position.

Moreover, as illustrated in FIG. 3B, the recess 58c is configured to allow communication between the second communication groove 56b and the third communication groove 56c in the second position. That is, in the first position, as illustrated in FIG. 3A, the cylinder port 38a communicates with the valve port 38b, whereas in the second position, as illustrated in FIG. 3B, the cylinder port 38a communicates with the exhaust port 38c. It is preferable that the cross-sectional area of a channel formed by the recess 58c in the spool 52 and the third communication groove 56c in the spool guide portion 48a when the switching valve 38 is in the first position be larger than or equal to the channel cross-sectional area of a speed controller (for example, the operating-speed adjustment portion 40) so that the passage of high-pressure air and exhaust air is not blocked.

A return spring 59 (biasing member) is disposed at one axial end of the spool 52 (on the right of the figure). The return spring 59 is, for example, a coil spring biasing the spool 52 to the left of the figure.

A drive piston 60 is disposed at another axial end of the spool 52 (on the left of the figure). The drive piston 60 biases the spool 52 to the right of the figure to move the spool 52 to the first position using the pressure of pilot air introduced from the pilot port 38d. The drive piston 60 has a larger diameter than the spool 52 and is accommodated in a piston accommodation portion 48b. The drive piston 60 airtightly partitions the piston accommodation portion 48b into an empty room adjacent to the spool 52 and an empty room adjacent to the end cover 50. A channel 62 extending from the pilot port 38d has an opening in the piston accommodation portion 48b adjacent to the end cover 50. The pilot-air adjustment portion 44 is disposed at a point on the channel 62.

As illustrated in FIG. 1, the pilot-air adjustment portion 44 includes a throttle valve 44a and a check valve 44b disposed in parallel to the throttle valve 44a. The pilot port 38d of the head-side switching valve 38 is supplied with high-pressure air serving as pilot pressure via a channel branching off from the first channel 32. The drive piston 60 is driven by the pilot pressure to switch the position of the spool 52 from the second position illustrated in FIG. 3B to the first position illustrated in FIG. 3A. When the pressure of air supplied from the high-pressure air supply source 18 to the pilot-air adjustment portion 44 is not sufficient, the spool 52 constituting the switching valve 38 switches from the first position (FIG. 3A) to the second position (FIG. 3B) by the elastic force of the return spring 59.

Figure 4:
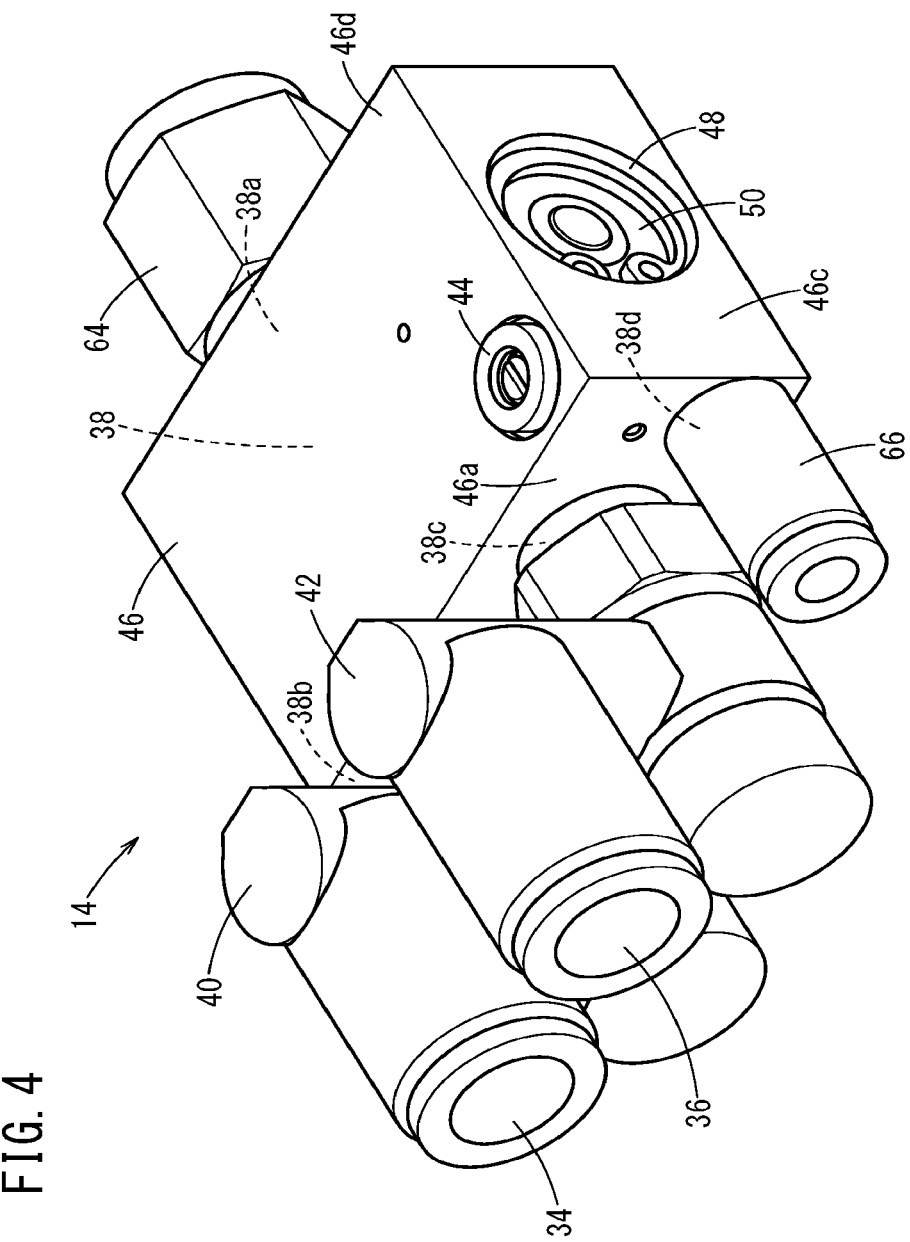
FIG. 4 is a perspective view of the housing in FIG. 2A to which an operating-speed adjustment portion, an exhaust flow rate adjustment portion, and a joint for pipe connection to a cylinder are attached.

As illustrated in FIG. 4, a joint 64 for connecting a pipe (first channel 32) communicating with the air cylinder 12 is connected to the cylinder port 38a of the switching valve 38. The head-side operating-speed adjustment portion 40 is connected to the valve port 38b, and the head-side exhaust flow rate adjustment portion 42 is connected to the exhaust port 38c to configure the head-side flow rate controller 14 as above. A joint 66 is connected to the pilot port 38d.

As illustrated in FIG. 1, the head-side operating-speed adjustment portion 40 includes a throttle valve 40a disposed on the primary channel 34 to variably adjust the flow rate of high-pressure air, and a check valve 40b disposed in parallel to the throttle valve 40a. The downstream side of the throttle valve 40a and the check valve 40b is connected to a first port 16a (described below) of the operation switching valve 16. That is, the operating-speed adjustment portion 40 functions as a meter-in speed controller allowing quick passage of exhaust air flowing from the air cylinder 12 toward the air outlet 20 while restricting the passage of high-pressure air flowing in the opposite direction.

The exhaust flow rate adjustment portion 42 includes a throttle valve 42a capable of variably adjusting the flow rate of air exhausted from the head-side port 26 of the air cylinder 12 during retraction of the piston 22, and a check valve 42b disposed in parallel to the throttle valve 42a. The downstream side of the throttle valve 42a and the check valve 42b is connected to the air outlet 20.

The end-side flow rate controller 14A disposed between the end-side port 30 of the air cylinder 12 and the operation switching valve 16 has a structure substantially identical to that of the head-side flow rate controller 14 configured as above. Thus, the same reference numbers and symbols are used for components identical to those in the head-side flow rate controller 14, and the detailed descriptions thereof will be omitted. Note that, in the end-side flow rate controller 14A, components corresponding to the first channel 32, the primary channel 34, the secondary channel 36, the switching valve 38, the operating-speed adjustment portion 40, the exhaust flow rate adjustment portion 42, and the pilot-air adjustment portion 44 in the head-side flow rate controller 14 have reference numbers ending with "A" so as to be distinguished.

Next, the operation switching valve 16 connected to the head-side flow rate controller 14 and the end-side flow rate controller 14A via the first channel 32 and the second channel 32A, respectively, will be described. The operation switching valve 16 is a five-way valve electrically switching the channel for high-pressure air and is provided with the first port 16a to a fifth port 16e. The first port 16a is connected to the first channel 32 (primary channel 34), and the second port 16b is connected to the second channel 32A (primary channel 34A). The third port 16c and the fifth port 16e are connected to the air outlet 20, and the fourth port 16d is connected to the high-pressure air supply source 18.

Next, the operational effects of the drive device 10 according to the first embodiment will be described.

When the operation switching valve 16 is in a first position as illustrated in FIG. 1, the working stroke, during which the piston rod 23 of the air cylinder 12 is pushed out, is performed. The head-side port 26 is connected to the high-pressure air supply source 18 via the first channel 32 and supplied with high-pressure air via the flow rate controller 14. The head-side switching valve 38 shifts to the first position under the effect of pilot air supplied via the pilot-air adjustment portion 44 through the branch of the first channel 32. As a result, the head-side primary channel 34 (first channel 32) communicates with the head-side port 26, and high-pressure air is supplied to the head-side pressure chamber 24. The flow rate of high-pressure air supplied to the head-side pressure chamber 24 is regulated by the throttle valve 40a of the head-side operating-speed adjustment portion 40. Thus, the piston rod 23 is pushed out at a predetermined operating speed adjusted by the operating-speed adjustment portion 40.

In contrast, the end-side second channel 32A communicates with the air outlet 20 via the operation switching valve 16. In the early stage of the working stroke, sufficient pilot air remains in an end-side switching valve 38A. Thus, as illustrated in FIG. 3A, the spool 52 is in the first position due to the biasing force of the drive piston 60. Consequently, as illustrated in FIG. 1, the end-side port 30 communicates with the primary channel 34A. Exhaust air from the end-side pressure chamber 28 is quickly discharged via the check valve 40b of an operating-speed adjustment portion 40A.

Figure 5:
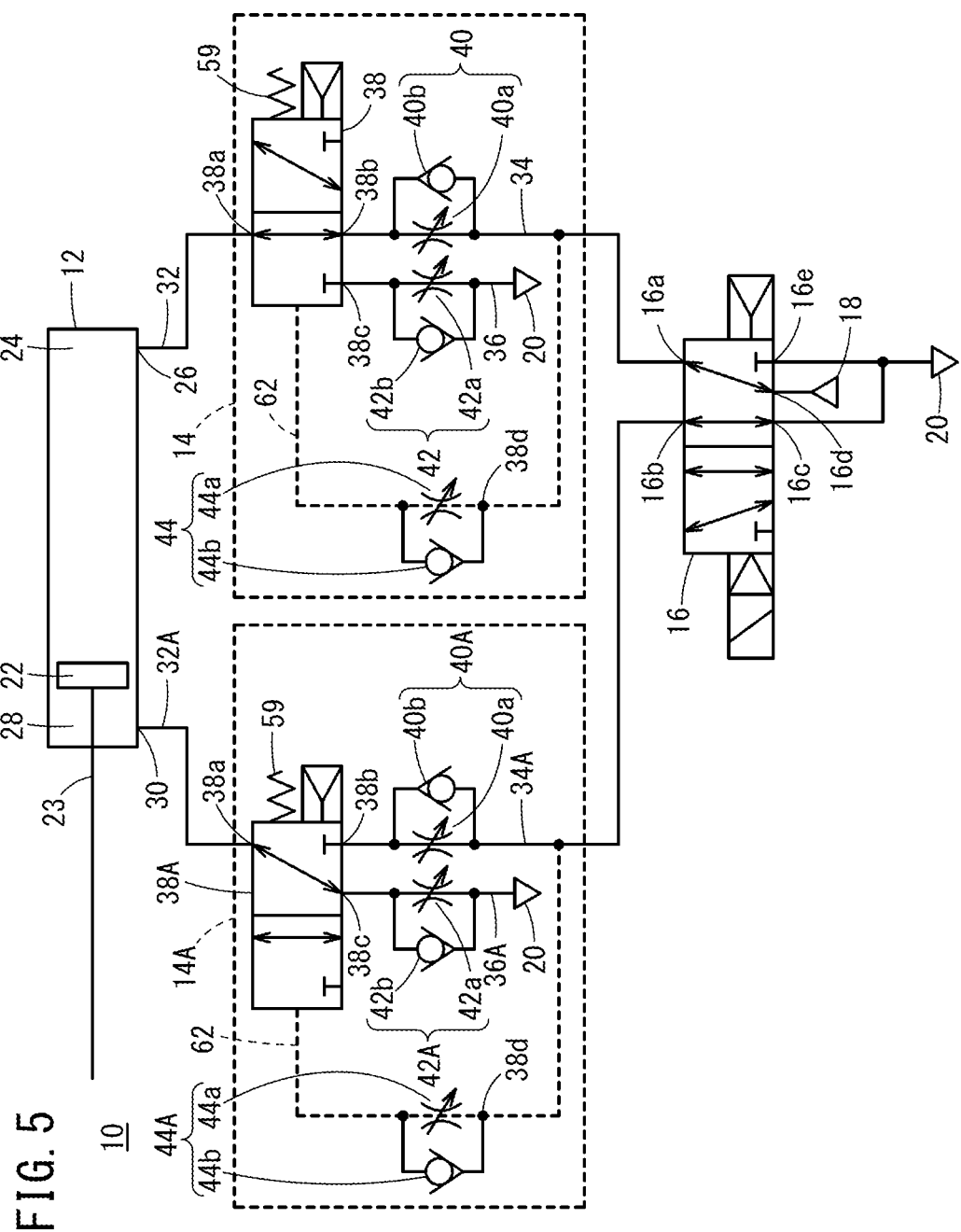
FIG. 5 is a fluid circuit diagram illustrating a connection state of the flow rate controllers and the drive device in FIG. 1 during the working stroke of an air cylinder.

Pilot air in the switching valve 38A gradually flows out to the air outlet 20 via the throttle valve 44a of a pilot-air adjustment portion 44A. The outflow rate of pilot air is adjusted by the opening of the throttle valve 44a. The pilot pressure in the end-side switching valve 38A decreases as the piston 22 of the air cylinder 12 approaches the end of the stroke after a predetermined period of time has passed since the start of the working stroke, and the spool 52 shifts to the second position as illustrated in FIG. 3B under the effect of the return spring 59. As a result, the cylinder port 38a and the exhaust port 38c of the end-side switching valve 38A are connected to each other as illustrated in FIG. 5. The end-side pressure chamber 28 communicates with an end-side secondary channel 36A via the end-side port 30 and the switching valve 38A. Exhaust air from the end-side port 30 is discharged from the air outlet 20 while the flow rate thereof is being adjusted by the throttle valve 42a of an end-side exhaust flow rate adjustment portion 42A.

Since the flow rate at the throttle valve 42a of the end-side exhaust flow rate adjustment portion 42A is set to be less than the flow rate at the throttle valve 40a of the head-side operating-speed adjustment portion 40, the operating speed of the air cylinder 12 is reduced. As a result, the end-side exhaust flow rate adjustment portion 42A functions as an air cushion to reduce impact at the end of the stroke of the air cylinder 12.

Figure 6:
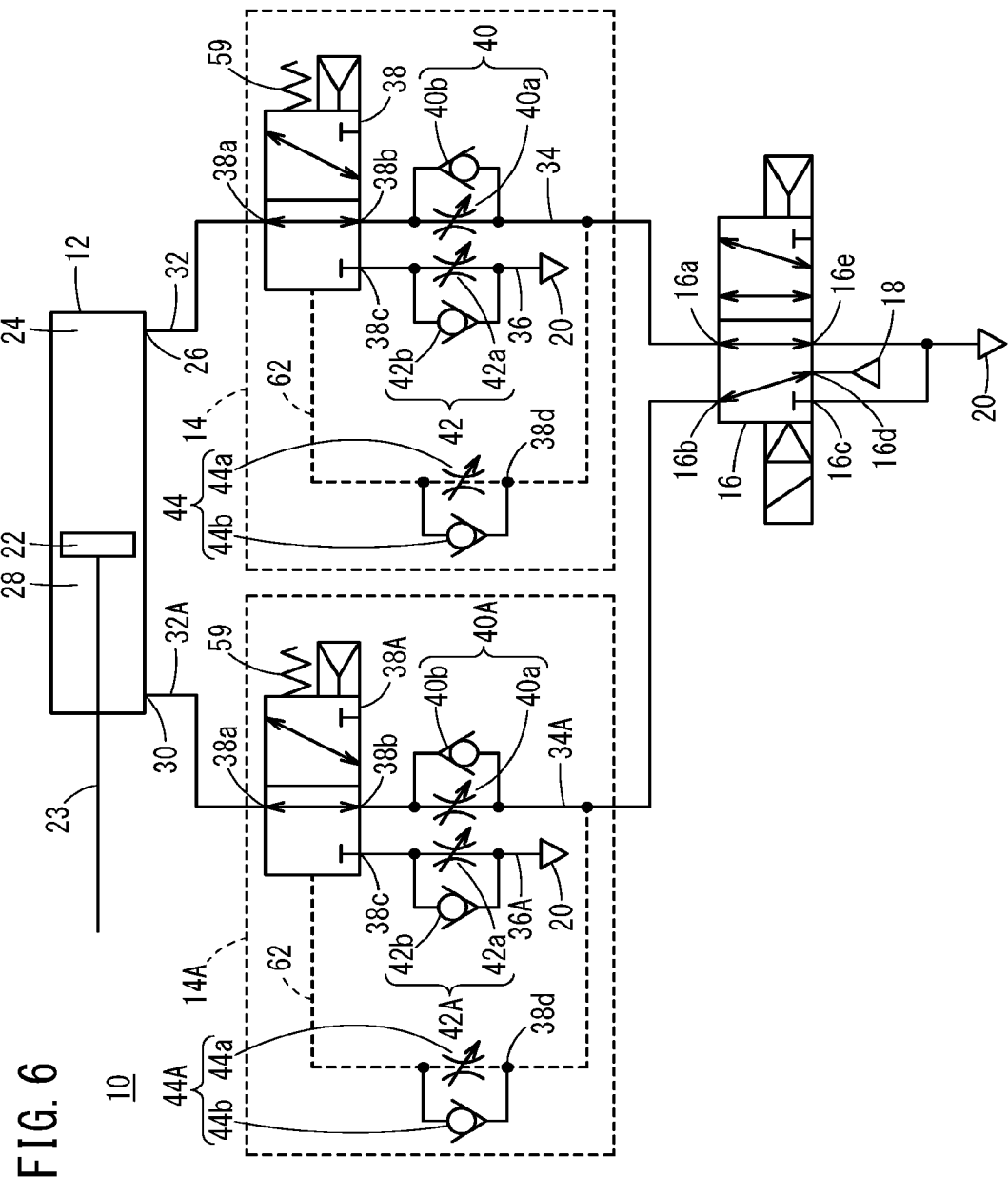
FIG. 6 is a fluid circuit diagram illustrating a connection state of the flow rate controllers and the drive device in FIG. 1 during the retraction stroke of the air cylinder.

Subsequently, the operation switching valve 16 switches to a second position as illustrated in FIG. 6, and the retraction stroke of the air cylinder 12 is performed. During the retraction stroke, the second channel 32A of the end-side flow rate controller 14A communicates with the high-pressure air supply source 18, whereas the first channel 32 of the head-side flow rate controller 14 communicates with the air outlet 20. During the retraction stroke, exhaust air is discharged via the head-side flow rate controller 14 in contrast to the working stroke.

Figure 7:
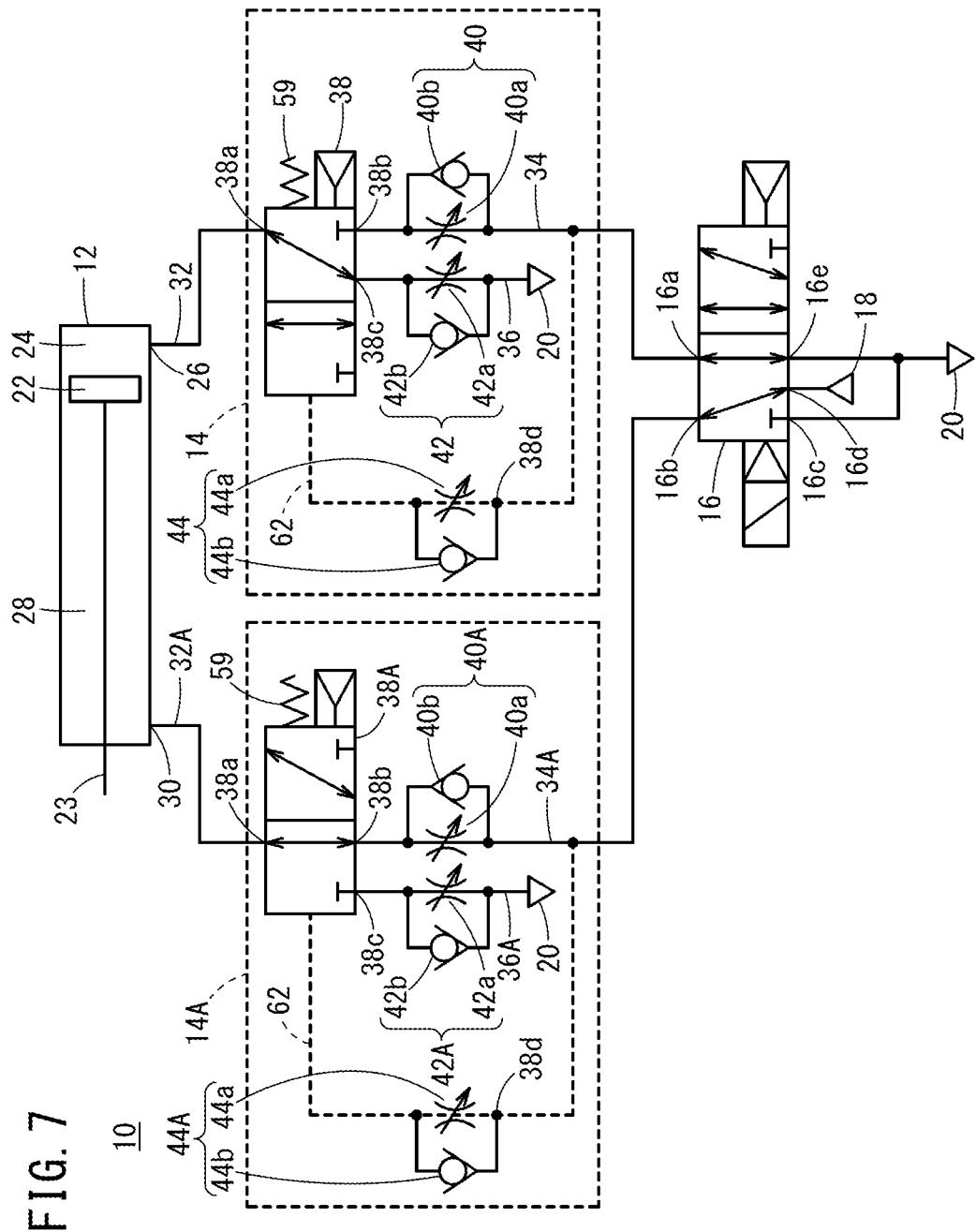
FIG. 7 is a fluid circuit diagram illustrating a connection state of the flow rate controllers and the drive device in FIG. 1 near the end of the stroke during the retraction stroke of the air cylinder.

At this time, near the end of the stroke, the head-side flow rate controller 14 operates as does the end-side flow rate controller 14A as described with reference to FIG. 5. That is, near the end of the retraction stroke, the flow rate controller 14 connects the head-side pressure chamber 24 to the secondary channel 36 as illustrated in FIG. 7 so that the flow rate of exhaust air in the head-side pressure chamber 24 is regulated by the throttle valve 42a. In this manner, the head-side flow rate controller 14 operates to reduce impact during the retraction stroke of the air cylinder 12.

The flow rate controllers 14 and 14A and the drive device 10 according to this embodiment described above produce the following effects.

In the flow rate controllers 14 and 14A, the switching valves 38 and 38A each include the housing 46 including the valve port 38b connected to the operation switching valve 16 via the corresponding primary channel 34 or 34A, the exhaust port 38c connected to the air outlet 20 via the corresponding secondary channel 36 or 36A, the cylinder port 38a connected to the air cylinder 12, and the pilot port 38d into which pilot air to the corresponding switching valve 38 or 38A is introduced; the spool guide portion 48a including the first communication groove 56a communicating with the valve port 38b, the second communication groove 56b communicating with the exhaust port 38c, and the third communication groove 56c formed between the first communication groove 56a and the second communication groove 56b and communicating with the cylinder port 38a; the spool 52 disposed in the spool guide portion 48a to be slidable in the axial direction, and including the first sealing wall 58a blocking communication between the second communication groove 56b and the third communication groove 56c in the first position, the second sealing wall 58b blocking communication between the first communication groove 56a and the third communication groove 56c in the second position, and the recess 58c formed between the first sealing wall 58a and the second sealing wall 58b and connecting the first communication groove 56a or the second communication groove 56b to the third communication groove 56c; the drive piston 60 communicating with the pilot port 38d and configured to move the spool 52 to the first position by biasing the spool 52 in the axial direction under the effect of a predetermined pilot pressure; and the return spring 59 (biasing member) configured to return the spool 52 to the second position by biasing the spool 52 in a direction opposite to the direction in which the drive piston 60 biases the spool 52.

According to the flow rate controllers 14 and 14A configured as above, the switching valves 38 and 38A switch near the end of the stroke, whereby impact at the end of the stroke of the air cylinder 12 can be reduced. In addition, since the flow rates at the switching valves 38 and 38A can be easily increased, the operation of the air cylinder 12 can be easily sped up.

In the first position of the flow rate controllers 14 and 14A, the cross-sectional area of the channel formed by the recess 58c in the spool 52 and the first communication groove 56a in the spool guide portion 48a may be larger than or equal to the channel cross-sectional area of the speed controller. As a result, the flow rates at the flow rate controllers 14 and 14A can be increased, and thus the operation of the air cylinder 12 can be easily sped up.

In each of the flow rate controllers 14 and 14A, the corresponding pilot-air adjustment portion 44 or 44A may be disposed at a point on the channel 62 between the pilot port 38d and the drive piston 60 inside the housing 46. By arranging the pilot-air adjustment portions 44 and 44A inside the housings 46, the number of external parts can be reduced, and the device structure can be simplified.

Each of the flow rate controllers 14 and 14A may further include the corresponding operating-speed adjustment portion 40 or 40A disposed on the corresponding primary channel 34 or 34A connecting the valve port 38b and the operation switching valve 16 and configured to adjust the operating speed of the air cylinder 12 by adjusting the high pressure flow rate of air flowing in the corresponding primary channel 34 or 34A. This preferably allows adjustment of the operating speed of the air cylinder 12 during its normal stroke.

In each of the flow rate controllers 14 and 14A, the corresponding operating-speed adjustment portion 40 or 40A may include the throttle valve 40a and the check valve 40b disposed in parallel to the throttle valve 40a and connected in a direction allowing passage of exhaust air discharged from the air cylinder 12. This enables exhaust air from the air cylinder 12 to be quickly discharged from the air outlet 20.

Second Embodiment

Figure 8:
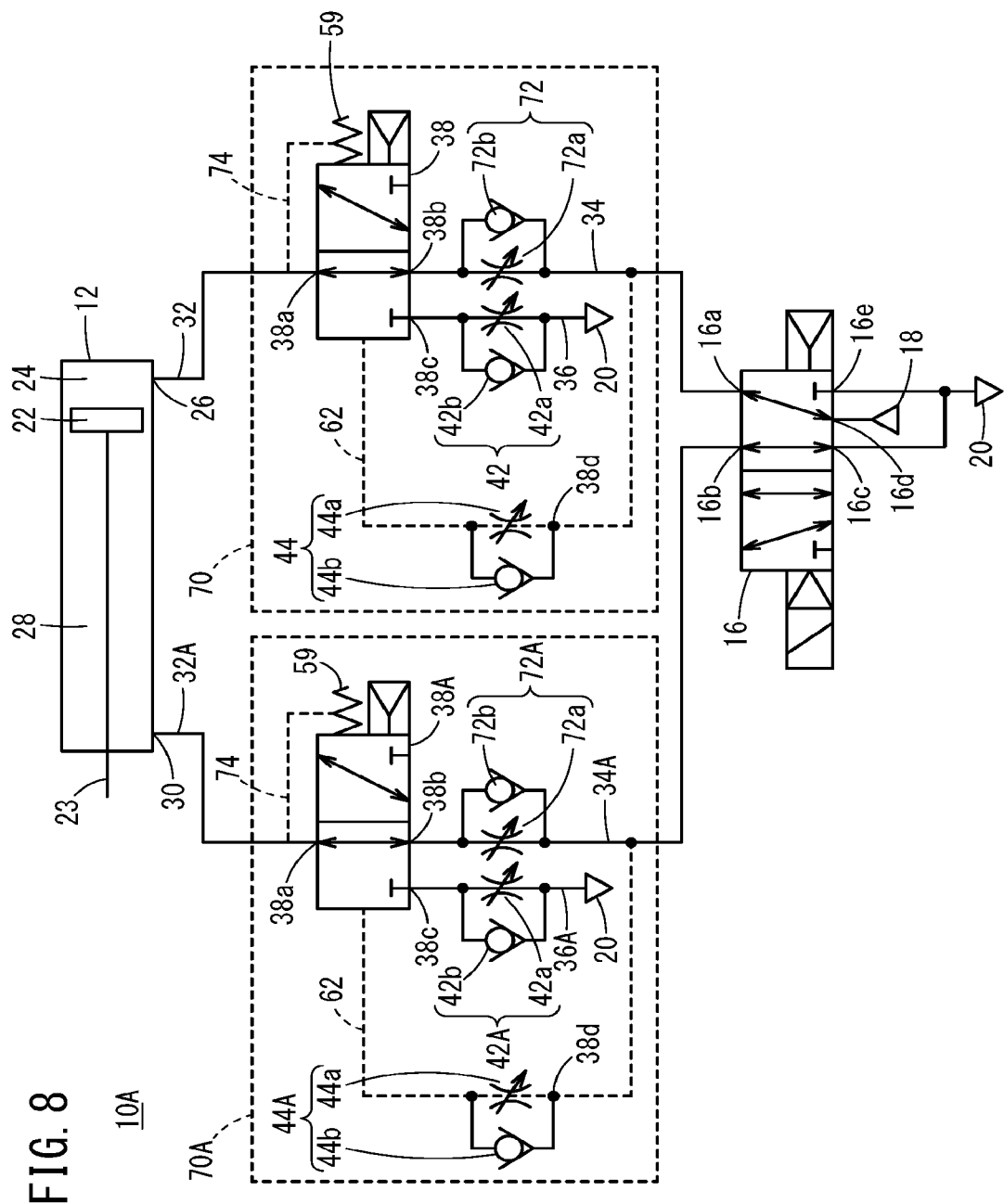
FIG. 8 is a fluid circuit diagram of flow rate controllers and a drive device according to a second embodiment.

As illustrated in FIG. 8, a drive device 10A according to this embodiment includes meter-out flow rate controllers 70 and 70A controlling the operating speed of the air cylinder 12 during its normal stroke using the flow rate of exhaust air. In the drive device 10A and the flow rate controllers 70 and 70A, the same reference numbers and symbols are used for components similar to those in the drive device 10 and the flow rate controllers 14 and 14A according to the first embodiment, and the detailed descriptions thereof will be omitted.

In the drive device 10A, the head-side flow rate controller 70 is connected to the head-side port 26 of the air cylinder 12, whereas the end-side flow rate controller 70A is connected to the end-side port 30 of the air cylinder 12.

The basic structure of the head-side flow rate controller 70 is similar to that of the flow rate controller 14 illustrated in FIG. 1 except that an operating-speed adjustment portion 72 faces a direction opposite to that the operating-speed adjustment portion 40 faces. That is, the upstream side of the operating-speed adjustment portion 72 is connected to the operation switching valve 16, whereas the downstream side thereof is connected to the valve port 38b of the switching valve 38.

Figure 9A:
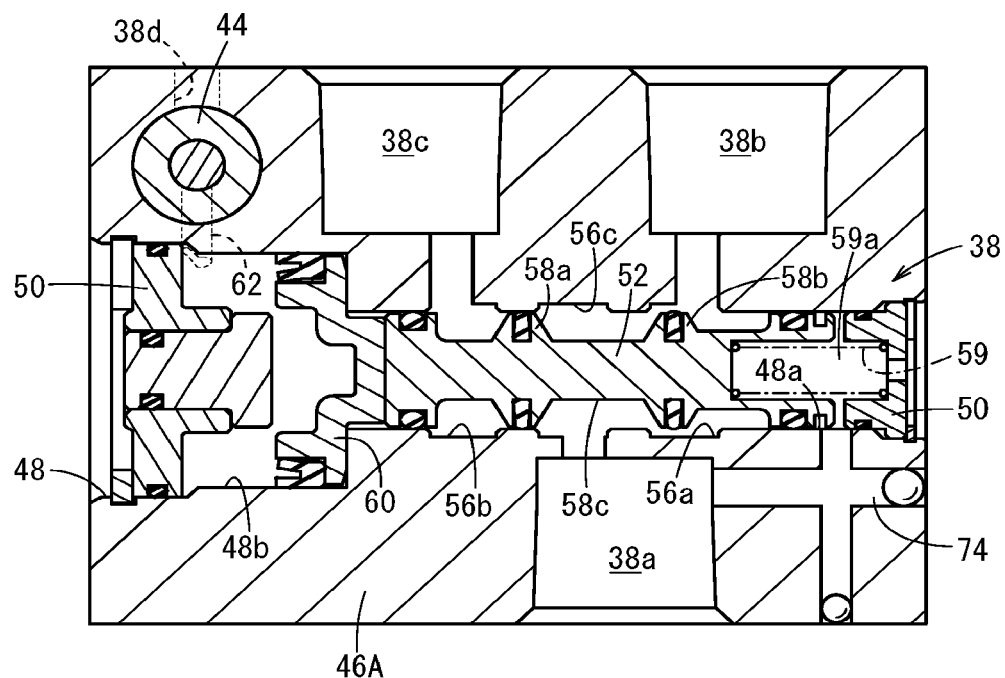
FIGS. 9A and 9B are cross-sectional views of a housing for a switching valve in FIG. 8.
Figure 9B:
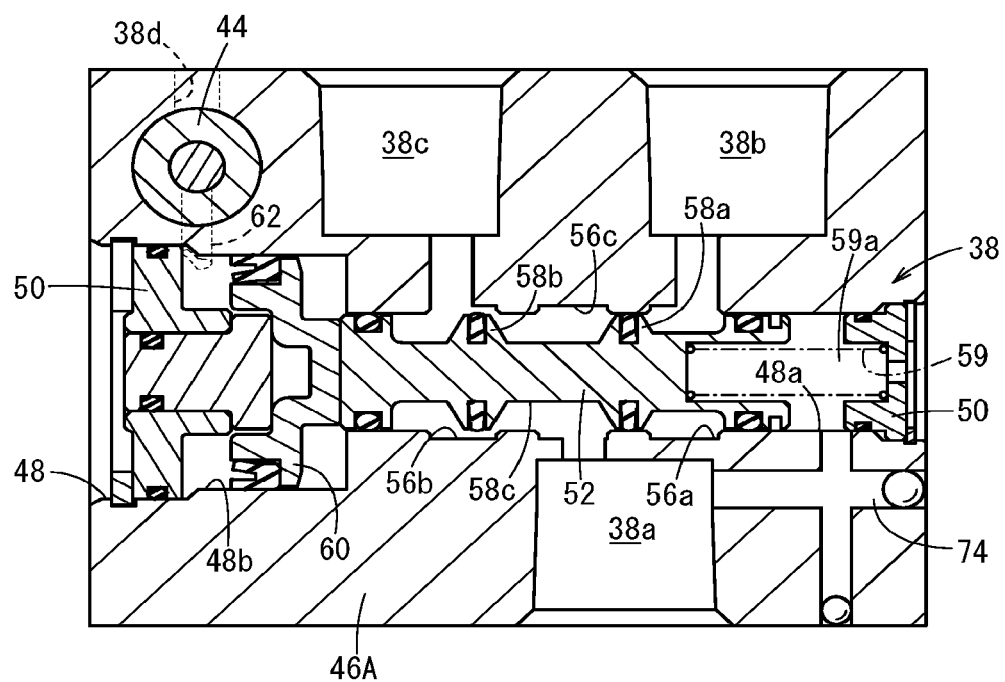

Moreover, in the flow rate controller 70 according to this embodiment, pressure acts on the spool 52 of the switching valve 38 via the cylinder port 38a due to the meter-out control. Thus, to enable reliable operation of the spool 52, as illustrated in FIGS. 9A and 9B, the flow rate controller 70 is provided with a return assist channel 74 that guides the back pressure at the cylinder port 38a to a return-spring accommodation chamber 59a (biasing-member accommodation chamber) in which the return spring 59 is disposed.

Since the end-side flow rate controller 70A has a structure similar to that of the head-side flow rate controller 70, the same reference numbers and symbols are used for common components, and the detailed descriptions thereof will be omitted. Note that some components of the end-side flow rate controller 70A have reference numbers ending with "A".

The operations and operational effects of the drive device 10A and the flow rate controllers 70 and 70A according to this embodiment will now be described.

As illustrated in FIG. 8, during the working stroke in which the piston 22 and the piston rod 23 are pushed out, high-pressure air is introduced into the head-side pressure chamber 24 of the air cylinder 12 via the head-side flow rate controller 70. At this time, high-pressure air from the high-pressure air supply source 18 passes through a check valve 72b of the head-side operating-speed adjustment portion 72, and thus the flow rate is not regulated by a throttle valve 72a. In contrast, exhaust air in the end-side pressure chamber 28 is discharged from the air outlet 20 via an end-side operating-speed adjustment portion 72A. At this time, the flow rate (flow velocity) of exhaust air is regulated by the throttle valve 72a of the end-side operating-speed adjustment portion 72A. As a result, the operating speed of the piston 22 during the working stroke is controlled to a predetermined value. In this manner, during the working stroke, the operating speed of the piston 22 is regulated by the throttle valve 72a of the end-side operating-speed adjustment portion 72A.

Moreover, as illustrated in FIG. 9A, during the working stroke, back pressure acts on a path communicating with the cylinder port 38a and the valve port 38b in the end-side flow rate controller 70A. When the back pressure acts on the path, the spool 52 may not be reliably returned only by the biasing force of the return spring 59. To deal with this, in this embodiment, the back pressure at the cylinder port 38a is introduced into the return-spring accommodation chamber 59a via the return assist channel 74 inside a housing 46A. In this manner, the back pressure can be used to return the spool 52 to the second position (FIG. 9B).

In the end-side flow rate controller 70A, when the pilot pressure biasing the drive piston 60 decreases, the spool 52 moves to the second position as illustrated in FIG. 9B under the effect of the return spring 59 and the back pressure in the return-spring accommodation chamber 59a, and the end-side port 30 communicates with the end-side exhaust flow rate adjustment portion 42A (see FIG. 8). As a result, the flow rate of exhaust air is reduced by the throttle valve 42a of the end-side exhaust flow rate adjustment portion 42A (see FIG. 8), and thereby the stroke speed of the air cylinder 12 is regulated. In this manner, when the operating speed of the air cylinder 12 is controlled by meter-out control, the speed of the air cylinder 12 can also be reduced near the end of the stroke to reduce impact.

Note that the operation of the head-side flow rate controller 70 connected to the head-side port 26 and the operation of the end-side flow rate controller 70A during the retraction stroke of the air cylinder 12 are simply swapped with each other during the working stroke. During the retraction stroke, the operating speed of the air cylinder 12 near the end of the stroke is regulated by the head-side flow rate controller 70.

The drive device 10A and the flow rate controllers 70 and 70A according to this embodiment produce the following effects.

In each of the flow rate controllers 70 and 70A, the corresponding operating-speed adjustment portion 72 or 72A includes the throttle valve 72a connected to the corresponding primary channel 34 or 34A, and the check valve 72b disposed in parallel to the throttle valve 72a and connected in a direction blocking exhaust air discharged from the air cylinder 12 and allowing passage of high-pressure air flowing toward the air cylinder 12. With this, the operating speed of the air cylinder 12 can be controlled by meter-out control.

In each of the flow rate controllers 70 and 70A, the housing 46A that accommodates the corresponding switching valve 38 or 38A is provided with the return assist channel 74 connecting the cylinder port 38a and the return-spring accommodation chamber 59a accommodating the return spring 59. This enables back pressure acting on the spool 52 under meter-out control to also act on the return-spring accommodation chamber 59a. As a result, the spool 52 can be reliably returned by the return spring 59, and the operating speed of the air cylinder 12 can be reliably reduced at the end of the stroke.

Third Embodiment

Figure 10:
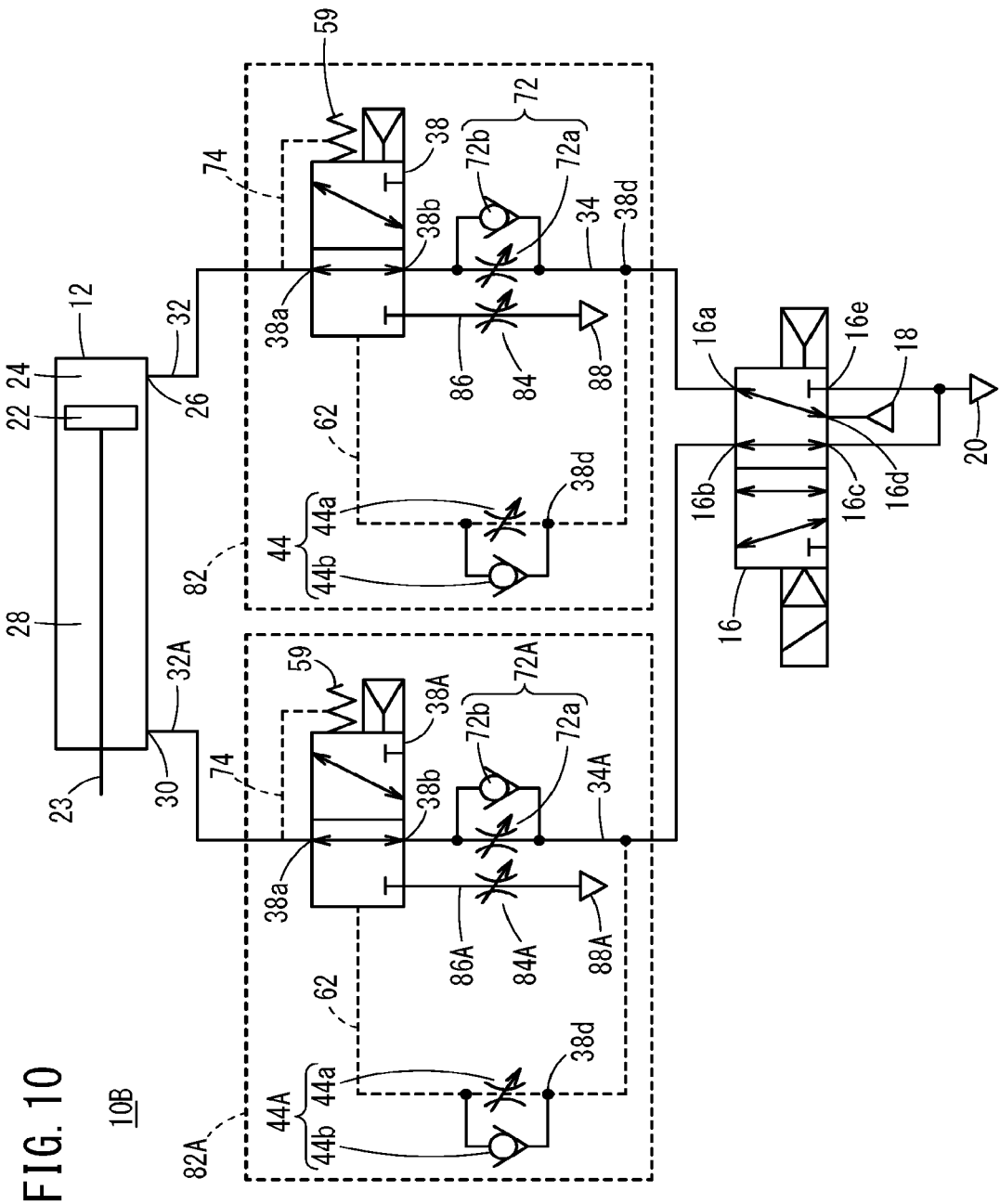
FIG. 10 is a fluid circuit diagram of flow rate controllers and a drive device according to a third embodiment.

As illustrated in FIG. 10, a drive device 10B according to this embodiment includes a head-side flow rate controller 82 connected to the head-side port 26 of the air cylinder 12, and an end-side flow rate controller 82A connected to the end-side port 30. The flow rate controllers 82 and 82A according to this embodiment are provided with a corresponding air outlet 88 or 88A instead of the exhaust port 38c to reduce pipes connected to a housing 46B (see FIG. 12B) that accommodate the corresponding switching valve 38 or 38A. The same reference numbers and symbols are used for components similar to those in the flow rate controllers 14 and 14A described with reference to FIGS. 1 to 7, and the detailed descriptions thereof will be omitted.

The head-side flow rate controller 82 includes a head-side exhaust channel 86 provided instead of the exhaust port 38c, and the head-side air outlet 88 communicating with the exhaust channel 86. An exhaust flow rate adjustment portion 84 is disposed at a point on the exhaust channel 86. The exhaust flow rate adjustment portion 84 is formed of, for example, a needle valve, and regulates the flow rate of exhaust air discharged via the exhaust channel 86 by increasing and reducing the channel cross-sectional area.

Figure 11A:
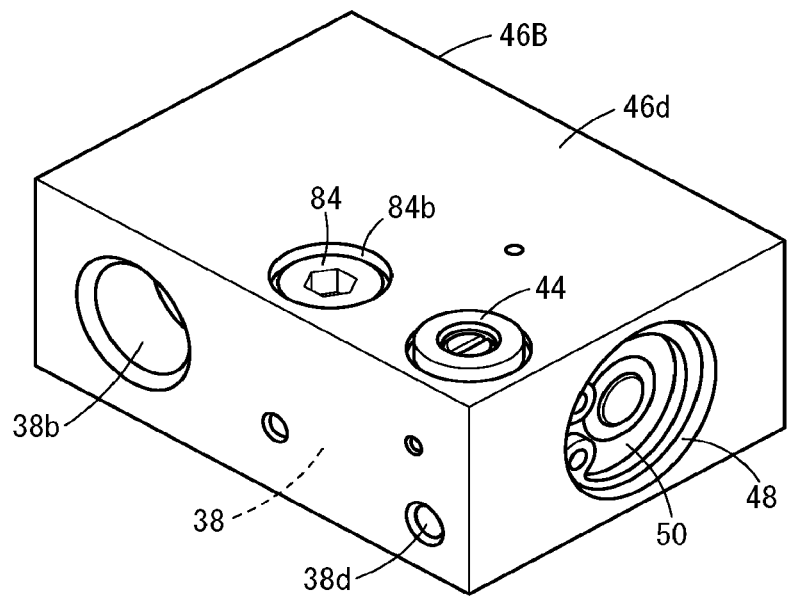
FIG. 11A is a perspective view of a housing for a switching valve according to the third embodiment viewed from a side on which a first port lies.
Figure 11B:
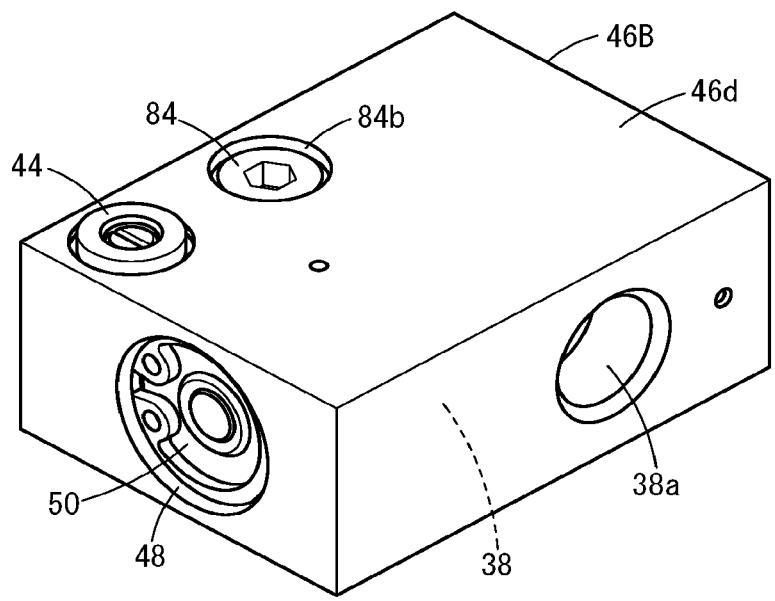
FIG. 11B is a perspective view of the housing in FIG. 11A viewed from a side on which a cylinder port lies.

As illustrated in FIGS. 11A and 11B, the switching valve 38 is accommodated inside the housing 46B. As illustrated in FIG. 11A, the housing 46B has a rectangular parallelepiped box shape, and adjustment screws of the pilot-air adjustment portion 44 and the exhaust flow rate adjustment portion 84 are exposed at the top face 46d. The flow rates at the pilot-air adjustment portion 44 and the exhaust flow rate adjustment portion 84 can be adjusted from above the top face using tools such as screwdrivers and wrenches.

As illustrated in FIG. 12B, the exhaust flow rate adjustment portion 84 is formed of a needle valve disposed inside a hole portion 84b passing through the housing 46B in the thickness direction (direction perpendicular to the top face 46d). A needle portion 84a moves back and forth by a screw mechanism formed on a side part of the needle portion 84a to change the channel cross-sectional area. The upstream side of the exhaust flow rate adjustment portion 84 communicates with the switching valve 38 (spool valve) via the exhaust channel 86 formed inside the housing 46B. The air outlet 88 is created at a lower end part of the hole portion 84b and configured to discharge exhaust air having passed through the needle portion 84a. That is, the downstream side of the exhaust flow rate adjustment portion 84 communicates with the air outlet 88. A silencer 88a made of, for example, a porous material may be disposed at the air outlet 88.

As illustrated in FIG. 12A, the cylinder port 38a and the valve port 38b are created in side faces of the housing 46B opposite to each other. Note that the housing 46B does not have the exhaust port 38c.

Figure 13A:
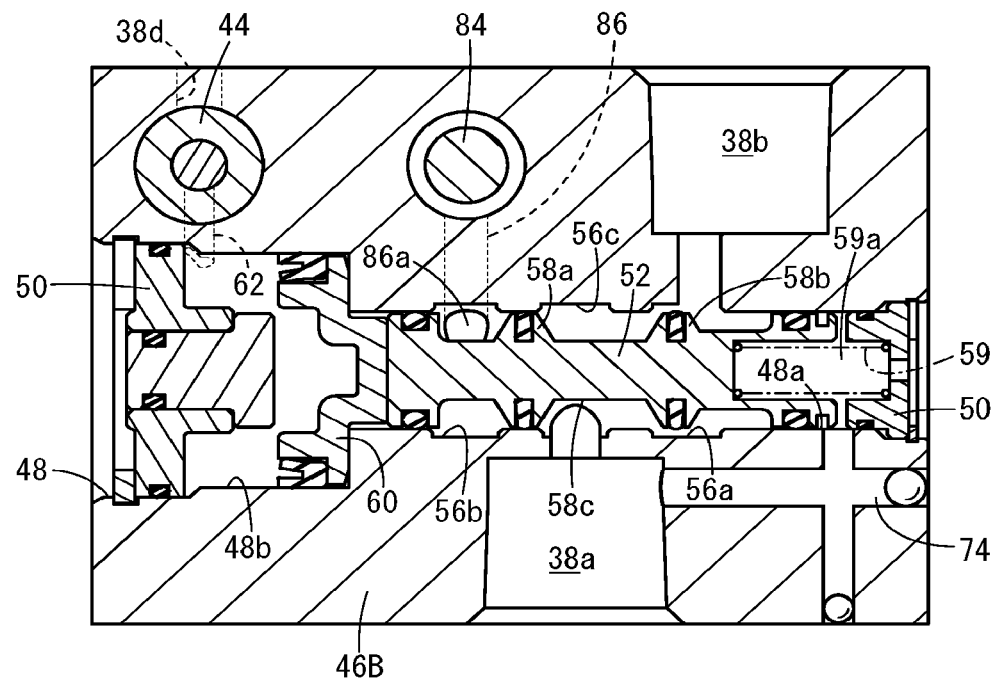
FIG. 13A is a cross-sectional view of the switching valve in FIG. 11A in the first position.

As illustrated in FIG. 13A, one end of the exhaust channel 86 connecting the exhaust flow rate adjustment portion 84 and the switching valve 38 communicates with the second communication groove 56b in the spool guide portion 48a, and the second communication groove 56b has an opening 86a of the exhaust channel 86.

Moreover, to enable reliable operation by the meter-out control, the return assist channel 74 similar to that in the housing 46A according to the second embodiment is formed in the housing 46B.

Figure 14:
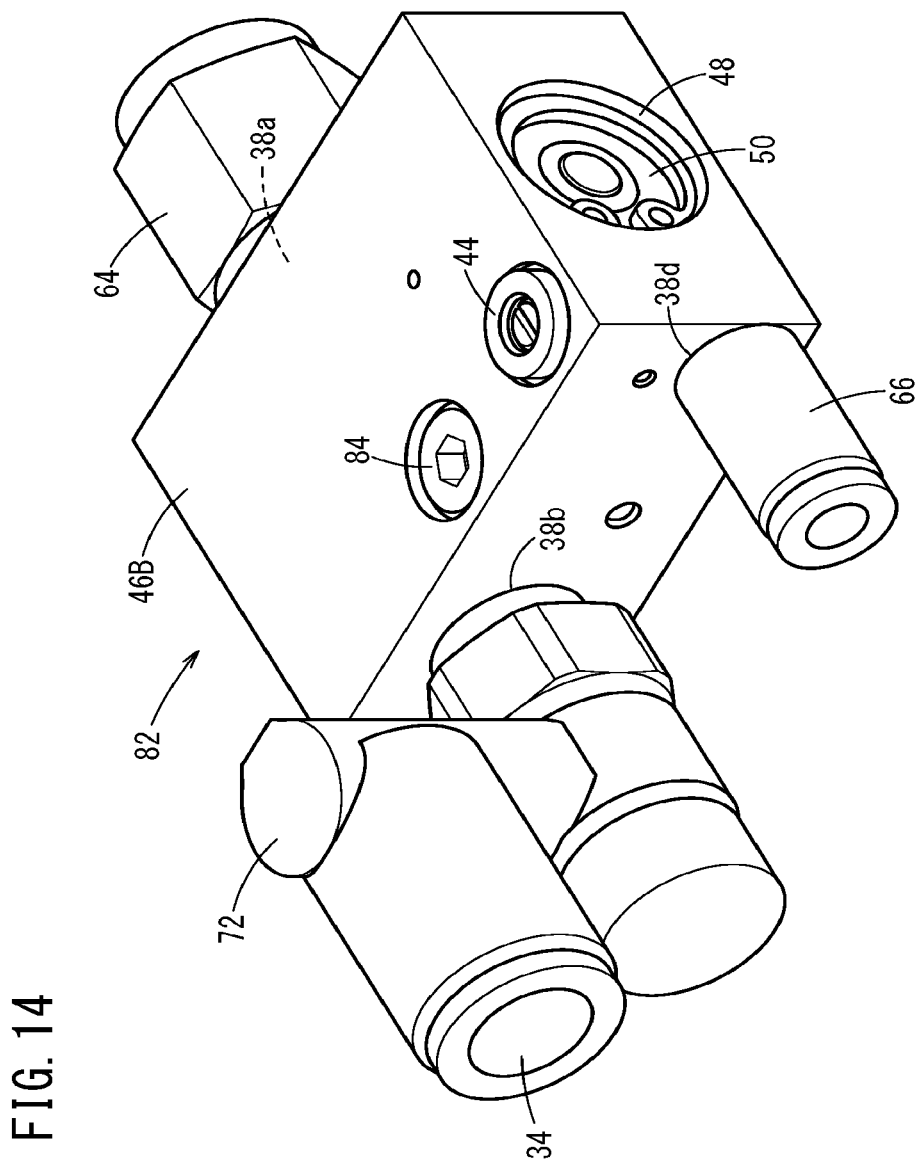
FIG. 14 is a perspective view of the flow rate controller according to the third embodiment.

As illustrated in FIG. 14, the flow rate controller 82 according to this embodiment is configured by connecting the joint 64, the operating-speed adjustment portion 72, and the joint 66 to the housing 46B. That is, the joint 64 for connecting a pipe communicating with the air cylinder 12 is connected to the cylinder port 38a. Moreover, the operating-speed adjustment portion 72 is connected to the valve port 38b. Furthermore, the joint 66 is connected to the pilot port 38d.

As illustrated in FIG. 10, the end-side flow rate controller 82A has a structure identical to that of the head-side flow rate controller 82. In the flow rate controller 82A, the same reference numbers and symbols are used for components identical to those in the head-side flow rate controller 82, and the detailed descriptions thereof will be omitted. Note that some components of the end-side flow rate controller 82A have reference numbers ending with "A" so as to be distinguished.

The flow rate controllers 82 and 82A are configured as above. The effects thereof will now be described.

In the housing 46B according to this embodiment, as illustrated in FIG. 13A, the spool 52 is disposed in the first position under the effect of pilot pressure on the drive piston 60 up to a point in time during the stroke to keep the cylinder port 38a and the valve port 38b communicating with each other.

Figure 13B:
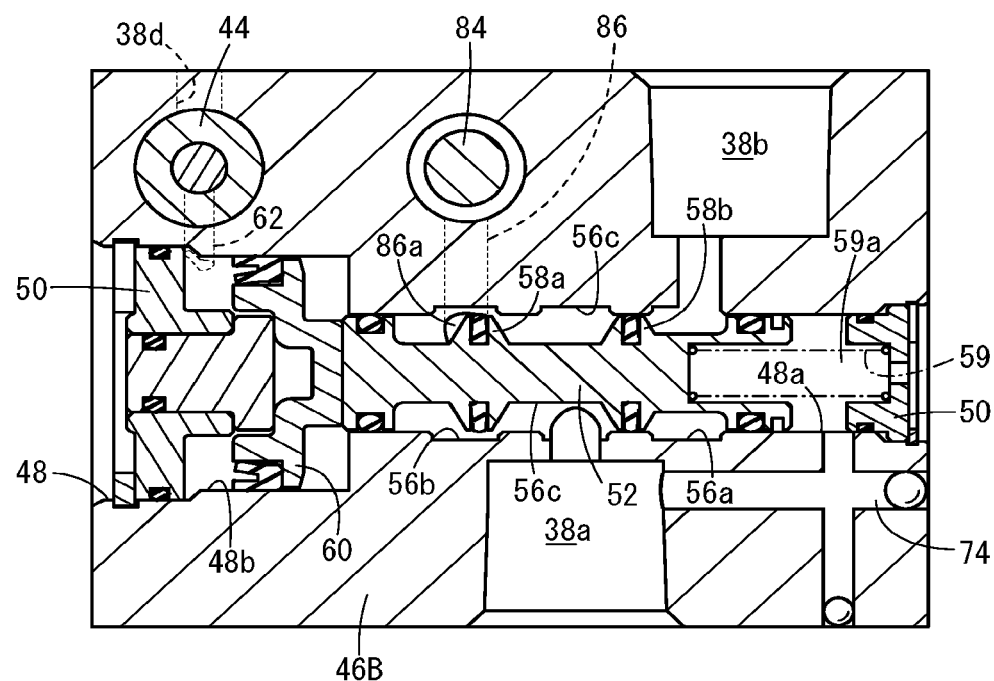
FIG. 13B is a cross-sectional view of the switching valve in FIG. 11A in the second position.

Since the pilot pressure on the drive piston 60 is released through the pilot-air adjustment portion 44A and decreases, the spool 52 moves to the second position under the effect of the return spring 59 (biasing member) at a point in time when the air cylinder 12 reaches near the end of the stroke. When the spool 52 has moved to the second position as illustrated in FIG. 13B, the cylinder port 38a communicates with an end-side exhaust channel 86A (see FIG. 10). Exhaust air from the air cylinder 12 is gradually discharged from the air outlet 88A while the flow rate thereof is being regulated by the needle portion 84a of an end-side exhaust flow rate adjustment portion 84A. As a result, the operating speed of the air cylinder 12 is reduced.

The flow rate controllers 82 and 82A and the drive device 10B according to this embodiment produce the following effects.

In each of the flow rate controllers 82 and 82A, the housing 46B that accommodates the corresponding switching valve 38 or 38A is provided with the corresponding exhaust flow rate adjustment portion 84 or 84A communicating with the second communication groove 56b, and the corresponding air outlet 88 or 88A. This negates the need for pipes communicating with the external air outlet 20, leading to a simple device structure.

The present invention has been described by taking preferred embodiments as examples. However, the present invention is not limited in particular to the above-described embodiments, and various modifications can be made thereto without departing from the scope of the present invention as a matter of course.

The invention claimed is:

1. A flow rate controller comprising:
   a primary channel through which high-pressure air supplied to an air cylinder and exhaust air discharged from the air cylinder pass;
   a secondary channel disposed in parallel to the primary channel;
   an exhaust flow rate adjustment portion disposed on the secondary channel and configured to adjust a flow rate of the exhaust air flowing in the secondary channel;
   a switching valve connected between the air cylinder and the primary channel and between the air cylinder and the secondary channel, and switching between a first position where the air cylinder communicates with the primary channel and a second position where the air cylinder communicates with the secondary channel; and
   a pilot-air adjustment portion configured to adjust an amount of time before the switching valve switches from the first position to the second position, wherein:
   the switching valve is formed of a spool valve switching to the first position by pilot pressure from the primary channel and returning to the second position as the pilot pressure decreases; and
   the pilot-air adjustment portion includes a throttle valve configured to regulate a flow rate of pilot air flowing out of the switching valve,
   wherein the flow rate controller further comprises:
   a housing including a pilot port into which the pilot air is introduced;
   a spool guide portion formed inside the housing;
   a spool disposed in the spool guide portion to be slidable in an axial direction;
   a drive piston communicating with the pilot port and configured to move the spool to the first position by biasing the spool in the axial direction under an effect of a predetermined pilot pressure;
   a biasing member configured to return the spool to the second position by biasing the spool in a direction opposite to the direction in which the drive piston biases the spool; and
   an operating-speed adjustment portion disposed on the primary channel and configured to adjust an operating speed of the air cylinder by adjusting a flow rate of the high-pressure air or the flow rate of the exhaust air flowing in the primary channel,
   wherein the operating-speed adjustment portion includes a throttle valve disposed on the primary channel, and a check e connected in parallel to the throttle valve and configured to block the exhaust air discharged from the air cylinder while allowing passage of the high-pressure air flowing toward the air cylinder, and
   wherein the housing is provided with a return assist channel connecting the cylinder port and a biasing-member accommodation chamber accommodating the biasing member.

2. The flow rate controller according to claim 1,
wherein the housing includes a valve port connected to the primary channel, an exhaust port connected to the secondary channel, and a cylinder port connected to the air cylinder;
the spool guide portion includes a first communication groove communicating with the valve port, a second communication groove communicating with the exhaust port, and a third communication groove formed between the first communication groove and the second communication groove and communicating with the cylinder port; and
the spool includes a first sealing wall configured to block communication between the second communication groove and the third communication groove in the first position, a second sealing wall configured to block communication between the first communication groove and the third communication groove in the second position, and a recess formed between the first sealing wall and the second sealing wall and configured to connect the first communication groove or the second communication groove to the third communication groove.

3. The flow rate controller according to claim 1, wherein, in the first position, a cross-sectional area of a channel formed by the recess in the spool and the first communication groove in the spool guide portion is larger than or equal to a cross-sectional area of the operating-speed adjustment portion.

4. The flow rate controller according to claim 1, wherein the pilot-air adjustment portion is disposed on a channel between the pilot port and the drive piston inside the housing.

5. The flow rate controller according to claim 1, wherein the housing includes an air outlet through which the exhaust air is discharged, and wherein the exhaust flow rate adjustment portion is disposed inside the housing.

6. A drive device comprising:
a high-pressure air supply source configured to supply high-pressure air to an air cylinder;
an air outlet through which exhaust air discharged from the air cylinder is discharged;
a primary channel which is connected to the air cylinder and through which the high-pressure air and the exhaust air pass;
a secondary channel disposed in parallel to the primary channel and communicating with the air outlet;
an operation switching valve connected between the primary channel and the high-pressure air supply source and between the primary channel and the air outlet, and switching between connecting the primary channel to the high-pressure air supply source and connecting the primary channel to the air outlet; and
a flow rate controller including an exhaust flow rate adjustment portion configured to adjust a flow rate of the exhaust air flowing in the secondary channel, a switching valve connected between the air cylinder and the primary channel and between the air cylinder and the secondary channel, and switching between a first position where the air cylinder communicates with the primary channel and a second position where the air cylinder communicates with the secondary channel, and a pilot-air adjustment portion configured to adjust an amount of time before the switching valve switches from the first position to the second position, the switching valve being formed of a spool valve switching to the first position by pilot pressure from the primary channel and returning to the second position as the pilot pressure decreases, the pilot-air adjustment portion including a throttle valve configured to regulate a flow rate of pilot air flowing out of the switching valve,
wherein the flow rate controller further includes:
a housing including a pilot port into which the pilot air is introduced;
a spool guide portion formed inside the housing;
a spool disposed in the spool guide portion to be slidable in an axial direction;
a drive piston communicating with the pilot port and configured to move the spool to the first position by biasing the spool in the axial direction under an effect of a predetermined pilot pressure;
a biasing member configured to return the spool to the second position by biasing the spool in a direction opposite to the direction in which the drive piston biases the spool; and an operating-speed adjustment portion disposed on the primary channel and configured to adjust an operating speed of the air cylinder by adjusting a flow rate of the high-pressure air or the flow rate of the exhaust air flowing in the primary channel,
wherein the operating-speed adjustment portion includes a throttle valve disposed on the primary channel, and a check valve connected in parallel to the throttle valve and configured to block the exhaust air discharged from the air cylinder while allowing passage of the high-pressure air flowing toward the air cylinder, and
wherein the housing is provided with a return assist channel connecting the cylinder port and a biasing-member accommodation chamber accommodating the biasing member.

* * * * *